(12) United States Patent
Van Der Wolf et al.

(10) Patent No.: US 8,732,409 B2
(45) Date of Patent: May 20, 2014

(54) CACHE MANAGEMENT POLICY AND CORRESPONDING DEVICE

(75) Inventors: Pieter Van Der Wolf, Leende (NL);
Abraham Karel Riemens, Eersel (NL);
Jan-Willem Van de Waerdt, San Jose, CA (US)

(73) Assignee: Entropic Communications, Inc., San Diego, CA (US)

( * ) Notice: Subject to any disclaimer, the term of this patent is extended or adjusted under 35 U.S.C. 154(b) by 410 days.

(21) Appl. No.: 13/129,751

(22) PCT Filed: Nov. 16, 2009

(86) PCT No.: PCT/IB2009/055080
§ 371 (c)(1),
(2), (4) Date: Jun. 20, 2011

(87) PCT Pub. No.: WO2010/055494
PCT Pub. Date: May 20, 2010

(65) Prior Publication Data
US 2011/0246723 A1 Oct. 6, 2011

(30) Foreign Application Priority Data
Nov. 17, 2008 (EP) .................................... 08169252

(51) Int. Cl.
*G06F 12/02* (2006.01)
*G06F 12/08* (2006.01)

(52) U.S. Cl.
CPC .................................. *G06F 12/0804* (2013.01)
USPC ............................ 711/143; 711/141; 711/144

(58) Field of Classification Search
USPC ........................................................ 711/143
See application file for complete search history.

(56) References Cited

U.S. PATENT DOCUMENTS

| | | | | |
|---|---|---|---|---|
| 4,530,054 | A | * | 7/1985 | Hamstra et al. ................ 711/133 |
| 5,133,061 | A | * | 7/1992 | Melton et al. ................. 711/128 |
| 5,493,662 | A | * | 2/1996 | Shinozaki et al. ............. 711/212 |
| 5,802,559 | A | * | 9/1998 | Bailey ........................... 711/118 |
| 6,078,992 | A | * | 6/2000 | Hum ............................... 711/122 |
| 6,119,205 | A | | 9/2000 | Wicki et al. |

(Continued)

FOREIGN PATENT DOCUMENTS

| | | | | |
|---|---|---|---|---|
| EP | 793178 | * | 9/1997 | .............. G06F 12/08 |
| EP | 1693760 | | 8/2006 | |

OTHER PUBLICATIONS

Sat Garcia, The Basics of Cache, date not available, Lecture Notes Handout at UCSD, Attached as CacheBasics_UCSD_Handout.pdf.*

(Continued)

*Primary Examiner* — John Lane
(74) *Attorney, Agent, or Firm* — Richard Bachand; O'Shea Getz P.C.

(57) ABSTRACT

A cache management policy is provided, comprising a method for writing back to a memory (104) a data element set (122) stored in a cache (110). The method reduces the time some items stay in the cache, and thereby improves the utilization of the cache for some applications, especially for video applications. The method comprises determining that each one of the multiple data elements has been updated through at least one write request; marking the data element set as a write-back candidate, in dependency on said determination; and writing the write-back candidate to the memory.

24 Claims, 4 Drawing Sheets

(56) References Cited

U.S. PATENT DOCUMENTS

| | | | |
|---|---|---|---|
| 6,185,658 B1 | 2/2001 | Arimilli et al. | |
| 6,226,715 B1 | 5/2001 | Van Der Wolf et al. | |
| 6,327,643 B1 | 12/2001 | Egan | |
| 6,704,835 B1 * | 3/2004 | Garner | 711/103 |
| 7,065,613 B1 | 6/2006 | Flake et al. | |
| 7,073,030 B2 * | 7/2006 | Azevedo et al. | 711/136 |
| 7,478,203 B2 * | 1/2009 | Caprioli et al. | 711/144 |
| 2003/0056062 A1 | 3/2003 | Prabhu | |
| 2003/0061452 A1 * | 3/2003 | Nakada | 711/144 |
| 2005/0038963 A1 | 2/2005 | Royer | |
| 2005/0172082 A1 | 8/2005 | Liu et al. | |

OTHER PUBLICATIONS

The Memory Management Reference, Author Not Known, 2001, Ravenbrook, Attached as MemoryManagementReference_2001. pdf.*

Christian Jul Jensen, TYPO3 Forum: Core Development>> RFC: Real Time Caching, Mar. 14, 2007, Attached as TYPO3_Caching_Jensen_2007.pdf.*

The C Programming Language, Second Edition, Kernighan & Ritchie, 1988, attached as Kernighan_Ritchie_1988_Bit_Fields. pdf.*

"CPU cache", http://en.wikipedia.org/wiki/Data_cache.

* cited by examiner

CACHE MANAGEMENT POLICY AND CORRESPONDING DEVICE

PRIORITY INFORMATION

This patent application claims priority from PCT patent application PCT/IB2009/055080 filed Nov. 16, 2009, which claims priority to EP patent application 08169252.7 filed Nov. 17, 2008, both of which are hereby incorporated by reference.

FIELD OF THE INVENTION

The invention relates to a method for writing back to a memory a data element set stored in a cache, the data element set comprising multiple data elements.

The invention further relates to a computer program for performing a method according to the invention on a computer and to a corresponding computer readable medium.

The invention further relates to a data processing device.

BACKGROUND OF THE INVENTION

The performance of a main memory can often be improved by providing the main memory with a cache. A cache is a type of memory, which is typically both faster and smaller than the main memory. When a data item is requested from a memory address of the main memory, i.e., in a read request, the data item, which is returned by the main memory, is also stored in the cache in a data element. Associated with the stored data item, the cache also stores a representation of the memory address corresponding to the data item. When, later, a request is made for the same memory address, the cache can return the data element without the need of consulting the main memory. Since the cache memory is faster than the main memory, this will improve the perceived response time of the memory system, formed by the combination of main memory and the cache.

One may also take advantage of a cache to improve the performance of a write request. Typically, when a request is made to the memory to store a data element at the memory address, i.e., a write request, the write request is intercepted by the cache. The cache stores the data element, together with the memory address. If later a read request or write request for the same memory address is made, the cache can respond without consulting the main memory. Again, the perceived response time for a read request is decreased, since the read-request can be handled from the cache without the need of consulting the main memory. Moreover, a cache decreases the number of read and write requests made on the main memory, as typically multiple requests are combined by the cache into a single large request, e.g., a request for an entire cache line. A modern main memory is more efficient in handling a request for an entire cache line in a burst, than single individual requests.

A cache is usually organized in a number of cache lines. Each cache line stores a number of data elements corresponding to a same number of main memory addresses. Typically, the main memory addresses are logically consecutive. Each time such a cache accesses the main memory for reading, a complete cache line is read, and consequently stored in the cache. Sometimes, this may result in the cache requesting data elements from the main memory that are not yet needed, i.e., which have not yet been requested.

Some basic operations on cache lines can be distinguished, typical in the design of a data cache.
fetch transfer data from the memory to the cache
invalidate mark the cache space as free, i.e., available for use; after invalidation, it does not contain valid data
copy-back transfer the data from the cache to the memory
pre-fetch transfer a cache line from memory to the cache before any part of the cache line is currently required by the processor to avoid stalling of the processor when the data is required Typical status information which may be associated with a cache line includes:
in-use indication that the cache line contains valid data, set after fetch or after a write operation
dirty bit indication that the cache line is modified compared to the contents of the main memory, typically set at a write operation
dirty mask a mask indicating which data elements in the cache line are modified compared to the main memory A problem with using the cache for write requests is that the main memory and the cache at some point in time store different data elements for the same memory address. A cache line is called 'dirty', if the cache line stores at least one data element and associated memory address such that the data element in main memory at the same associated memory address is different from the one in the cache. A dirty cache line may be 'cleaned' by copying the content of the cache line to main memory, thereby resolving the differences between the cache line and the corresponding content of the main memory.

Data is said, 'to be cached' when a copy of the data from the main memory resides in the cache, or when data in the cache is intended for later storage in the main memory.

An algorithm that determines the transfer of the data content of a cache line to main memory is called a write policy. A write policy typically decides which cache lines to write back to memory, and when to do so.

During use, caches may be 'full'. For example, after reading a large number of data elements from main memory, at some point all memory of the cache will be filled with cached copies of the large number of data elements. At that point no new data elements can be stored in the cache. To resolve this, at some point a cache line is reassigned to new main memory data elements. A cache line, which is so selected, is called a 'victim', or 'is victimized'. If a dirty cache line is victimized, it must, typically, first be cleaned before the cache line can be re-used for a new memory line. If the content of the main memory corresponding to a cache line is, e.g., as a result of the write-back, identical to the content of the cache line, then the data content of the cache-line can be discarded without losing the data. Such a cache line may be re-used immediately for caching of new data. Instead of immediate re-use, a cache line may also be marked as 'free', so that it is available later.

For efficiency reasons, when a free cache-line is needed, only a limited part of the cache may be searched for such a free cache-line. A cache with such a limited search strategy, is also called full if the limited search strategy cannot find a free cache-line among the limited part of the cache. Such a limited search strategy is, for example, applied in a so-called direct mapped cache, and also in an N-way set associative cache, such as a 2-way set associative cache. In an N-way set associative cache, the cache will only search through N cache lines before deciding if a cache line is available. If no cache line is available among those N cache lines, the cache is considered full, at least for the current operation.

An algorithm that determines when to victimize which cache lines is called a replacement policy or replacement strategy. A typical replacement policy is the 'least-recently-used policy', the LRU policy. The LRU policy selects the cache line for victimization which was used least recently. Some replacement policies aim to keep some pre-determined number of cache-lines free.

A write policy and a replacement policy will both be referred to as a 'cache management policy'.

The situation wherein a read or write request is made, but the corresponding data element is not in the cache, is called a 'cache miss'. If many cache misses occur the efficiency of the memory system is reduced. The write policy and the replacement policy are an important factor in the performance contribution of the cache. How well a cache management policy works depends on the access pattern to the main memory. For example, if the replacement policy victimizes a line, which is thereafter requested, a cache miss occurs. Other factors in the performance contribution of the cache include: the size of the cache, the size of the cache lines, the memory access pattern of an application using the cache, etc.

U.S. Pat. No. 6,327,643 describes a cache connected to a memory and a method of replacing a cache line in the cache with a new line from memory. The memory comprises multiple pages, each page comprising multiple banks. At any time one of the pages is 'current'. When a cache line must be replaced it is first determined if there exists cache lines which are not dirty. If so, the one which was least recently used is replaced. If all cache lines are dirty it is determined if there exists a cache line which corresponds to a part of the current page, and if so the one which was least recently used is replaced. Finally, if all cache lines are dirty and do not correspond to a part of the current page, then the oldest cache line is replaced.

SUMMARY OF THE INVENTION

It is a problem of known replacement policies that for some access patterns they cause many cache misses.

This problem is especially apparent in video processing applications. A video processing application can show complicated access patterns to the memory. For example, it may have a complicated access pattern for the input data, or for temporary working data. The access pattern to the memory for the output of a video processing application is, however, typically, fairly straightforward; once a data element of the output is computed it is written out and after that not used by the video processing application anymore, at least not for a long time compared to the typical time items stay in the cache. A known cache, however, treats the output data in the same way as any other data. Accordingly, output data will stay in the cache even though it is known that the data is not needed soon. This has the result that storage space in the cache is needlessly occupied. This space could be better applied to caching other data and thereby reducing the number of cache-misses for other data in the memory.

It is an object of the invention to provide a cache management policy with a reduced number of cache misses for some access patterns.

This and other objects are achieved by the method for writing back to a memory a data element set stored in a cache according to the invention. The data element set comprises multiple data elements. The method comprises: marking individually each one of the multiple data elements as updated through at least one write request; determining that each one of the multiple data elements has been updated through at least one write request; marking the data element set as a write-back candidate, in dependency on said determination; and writing the write-back candidate to the memory.

An application, e.g., a software application or hardware application, typically, writes to the memory, in a series of write requests, data elements which are known not to be needed anymore soon. The write requests update elements in the cache. At this point the write requests have not yet modified the memory. At the moment that it is determined that a data element set has been fully updated by the write requests, the method marks this data element set as a write-back candidate. The data element set, although marked, still takes up space in the cache and cannot be used for the caching of a read request or further write request, as doing so could change the data elements before they are written back to memory. Since the method according to the invention then writes the write-back candidate back to memory, the data set can be re-used. In this way, cache elements are freed quicker and more room is made in the cache for other uses, e.g., for storing more input data during the processing thereof. By storing more input data in the cache the processing is likely to increase in speed, as a result of a reduction of the number of operations on the main memory.

By marking each marking individually each one of the multiple data elements as updated through at least one write request, the cache can make the determination whether each one of the multiple data elements has been updated independently, by a computer program or device that causes the updates. This has the advantage that a designer of the device or a programmer of the computer program does not need to take into account when a data set has been completely updated; rather this aspect is transparent to him.

Typically, a data element set is a so-called cache line. Cache lines typically correspond to the physical memory organization of the memory such that reading a cache line can be done faster than reading the same number of elements scattered over the memory.

The write request, which updates one or more of the multiple data elements in the cache, typically comprises a write request data item and a write request address. A data element in the cache is updated, by changing the content of the data element in the cache to the content of the write request data item. Note that the updating is done for a data element in the cache that is associated with the write request address. The data element in the cache associated with the write request address is used for caching of the write requests data item in the write requests comprising the write request address, or for caching read request data items in read requests comprising a read request address corresponding to the write request address, until the data element set comprising the data element is marked as free, or as invalid, etc. The association between a data element in the cache and an address, is typically made, by only storing a representation of a start address associated with the first data element of the cache line. Data elements that are a number of positions further in the cache line than the first element, are associated with an address that is a corresponding number higher than the start address.

The cache typically comprises a tag memory. The tag memory stores for each data set, e.g., cache line, additional information. For example, the tag memory may store for each data set the main memory address which is associated with the data set. The associated main memory address indicates where the data set must be written to in case the data set is dirty. The tag memory may also store: a time stamp, indicating when the data in the data set was last used; a dirty mask, indicating which elements of the data set are dirty, etc.

In a practical embodiment, the data element set is marked as free, after the writing of the write-back candidate. This has the advantage that the cache has available free data element sets which are immediately available. When a read request or further write request is received in the cache for a data element which is not already cached, the cache can select any one of the cache lines marked as free and use it to cache the data elements related to the read request or further write request.

In a practical embodiment, the data element set is used to cache a read request or a further write request, without being marked as free in the meantime. For example, upon receiving the read request or the further write request, the cache may select a data element set marked as a write-back candidate. Only at that point, i.e., after the need for a free data element set has arisen, is the marked data element set written back to memory. The data element set can then immediately be re-used. Similarly, marking as a write-back candidate may be implemented by immediately moving forward with writing the data element set after it has been determined that all of the multiple data elements have been updated.

In a practical embodiment, a dirty mask comprises for each specific one of the multiple data elements a specific dirty bit for marking if the specific data element is updated through the write request. The marking individually each one of the multiple data elements as updated through at least one write request, comprises marking the specific dirty bit as dirty, upon receiving the write request updating the specific data element. The determining that each one of the multiple data elements has been updated comprises determining that all dirty bits in the dirty mask are marked dirty.

Using a dirty mask is very convenient for determining if a data element has been updated or not. For example, a specific circuitry could verify that all dirty bits in a dirty mask are marked dirty, e.g., by carrying out a Boolean 'and' operation on all the dirty bits. At this point, the data element set may be marked as a write-back candidate.

In a preferred embodiment, the dirty mask is coupled to a counter, and the method comprises updating the counter, upon marking the specific dirty bit as dirty. The determining that all dirty bits in the dirty mask are marked dirty comprises a determining that the counter has reached a counting value representative of the number of data elements in the data element set.

Using a counter has the advantage that the dirty bits comprised in the dirty mask need not all be verified to be dirty individually. Especially, if the data element set is large, this operation can be costly, in terms of time or hardware expenses. By counting how many dirty bits have been marked as dirty so far, there is no need to check all the dirty bits individually. Note that the counter is only updated when a dirty bit is changed from not-dirty to dirty.

Typical embodiments include: updating the counter by incrementing it, starting the counter at a value of zero and taking the counting value equal to the number of data elements in the data element set; updating the counter by decrementing it, starting the counter at a value equal to the number of data elements in the data element set and taking the counting value equal to 0, etc. It is not necessary for the counter to progress through a linear sequence of integers. For example, the counter may also progress through the values of a Gray code. The latter has the advantage that the updating does not require a carry-operation, which leads to a simplified design, wherein the average update time lies closely to the worst-case update time.

In a preferred embodiment, the memory comprises an address range and the marking of the data element set as a write-back candidate is done conditionally on the write request being for an address in the address range.

Typically, an application uses data which will not be re-used soon and other data which has a more complex access pattern, and which may be re-used soon. This can be arranged by providing two memories, one for each type of data. However, advantageously a single memory may be used for both types of data, by providing the memory with an address range. The data of the type that will not be re-used soon is only stored in memory addresses comprised in the address range. Data which may be re-used soon, is stored in memory addresses that lie outside the range. Since the method of the invention is only applied to data elements in the range, the data which may be re-used soon is unaffected. Note that the range need not be a logically consecutive region of memory addresses, but the range may, e.g., be formed by multiple logically consecutive ranges. Each one of the multiple logically consecutive ranges may, e.g., indicate a row of a block in an image. In one embodiment, the range corresponds to memory used for video output.

Marking conditionally can, e.g., be done by arranging the cache with a supplementary cache. A write request which needs regular caching can be sent to the supplementary cache, in dependency on the write request not being for an address in the address range. This has the advantage of simplifying the architecture, the cache can always apply early write-backs whereas the supplementary cache can employ a regular caching algorithm, e.g., an LRU algorithm. To select the cache or the supplementary cache based on an address range and address decoder can be arranged before the cache and the supplementary cache. When the address decoder receives a write request in the range, the address decoder forwards it to the cache. When the address decoder receives a write request out of the range, the address decoder forwards it to the supplementary cache.

This problem of having two types of access patterns in a single memory is also solved by providing a flag, which is arranged for being set and being reset. Conditionally on the flag being set, in addition to the other criteria of the method of the invention, the data element set is marked as a write-back candidate. A processor executing a software application, the processor using a cache that employs the method according to this embodiment, can switch the method on and off depending on whether the application expects that keeping output data in the cache is advantageous, because re-use of that data in the short term is likely. The flag may, e.g., be a global flag, valid for the whole of the cache or it may be valid for a region of the cache.

In a practical embodiment, the writing of the write-back candidate is done upon determining that a free data element set is required.

It may be that no free data element sets are currently required. In order to save unnecessary write backs to memory, the method may wait until such write backs are really required. This has the following advantage. It may occasionally happen that a particular write back candidate is written back to memory, even though it is shortly thereafter re-used. For the particular data element set, this will cause a cache miss. However, had the method waited with the writing back of the write-back candidate this cache miss would not have occurred. Reducing the number of cache misses increases the perceived efficiency of the memory.

In a preferred embodiment, the write-back candidate is selected from multiple write-back candidates. This may, for example, happen in a method wherein the writing back of the write-back candidate is delayed. The write-back candidate is selected that was the one used least recently from the multiple of write-back candidates. According to a heuristic in cache replacement policies the least-recently-used data element set is less likely to be needed soon, than a more recently used data element.

In a preferred embodiment, a time stamp is associated with the data set. The marking of the data element set as a write-back candidate comprises setting the time stamp to a predetermined value. The method further comprises, before the writing of the write-back candidate, selecting the write-back candidate from multiple data sets, by determining that the value of the time stamp is more or less than values of multiple time stamps associated with the multiple data sets.

Typically, the cache stores multiple data sets each with an associated time stamp. Each time a data set is used, its time stamp is updated. Typically, the time stamps are increasing or decreasing. Marking a data set as a write back candidate can be accomplished by setting the time stamp of that data set to a predetermined value so that it seems that it has not been used very recently. When time stamps are compared the write back candidate will be selected. If time stamps increase with each use, the predetermined value is chosen low. When time stamps decrease with each use, the predetermined value is chosen high. The predetermined value need not be fixed, but must be of such a magnitude that it will typically be selected when compared to the other time stamps.

In a practical embodiment of the method according to the invention, the writing of the write-back candidate is done substantially immediately after marking the data element set as a write-back candidate.

Although waiting with writing back a data element set can be advantageous, as explained above, it is also not without merit to do the opposite, i.e., writing back sooner rather than later. This has the advantage that free cache lines are immediately available, and no write back operation has to be started, when a free cache-line is required. This option will also lead to a simpler design, as deferring a decision may need more bookkeeping, and hence need a more complex design.

In a preferred embodiment, the writing of the write-back candidate to the memory comprises sending the write-back candidate to a further cache together with a write-through flag, wherein the write-through flag indicates to the further cache to write the write-back candidate substantially directly to memory.

The method according to the invention may also be used in a system with a hierarchical cache system, comprising multiple caches. By flagging the write-back candidate as 'write-through', the determination that a data set is a write-back candidate need not be made again. In this way the further cache does not need to keep an administration of which datasets can be marked as write-back candidates.

Typically the flagged write-back candidate is not stored in the further cache. However, if, in some embodiment, it is stored, it need not be stored as dirty, because the write-back candidate content and the corresponding memory content is identical.

The method according to the invention is of particular advantage in methods for video processing and methods for motion estimation. In these types of methods it frequently occurs that a large amount of data is outputted, which is not quickly needed again, i.e., is not likely to be requested for reading or writing soon. The details of video processing methods and of motion estimation methods, outside the art of caching data used or produced by such methods, is not a subject of the invention, and is known in the art.

Motion estimation methods may be used in video processing methods, such as video compression methods, video picture improvement, scan rate conversion, etc. Video processing methods, including those mentioned above, may be used in personal video recorders (PVR), video cameras, mobile phones, digital televisions, set-top boxes, etc.

The method according to the invention may also be applied to audio processing methods. Or more generally, advantage is expected in any data processing method wherein data is produced which is not accessed again within the average time a data item remains in the cache, and moreover the data of a single cache line is produced in a relatively short time interval.

The invention further relates to a computer program comprising computer program code adapted to perform all the steps of a method according to the invention. The computer program is typically embodied on a computer readable medium.

For completeness, reference is made to a so-called, 'write-through cache'. In a write-through cache all write operations to a cache line cause an immediate write back of the data to memory. A write-through cache has the advantage that cache-lines are kept clean. However, write-through caches have the disadvantage that a large number of memory accesses are generated. Accordingly, a low effective use of available interconnects and memory bandwidth is achieved. A difference between the invention and a write-through cache is that in the invention a determination is made that each one of the multiple data elements in a cache line has been updated through at least one write request. The advantage is that fewer memory accesses are needed since instead of a memory access after each write operation, only memory access are done after a full cache line has been written.

In conclusion, a cache management policy is provided, comprising a method for writing back to a memory a data element set stored in a cache. The method reduces the time some items stay in the cache, and thereby improves the utilization of the cache for some applications, especially for video applications.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

DETAILED DESCRIPTION OF THE INVENTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
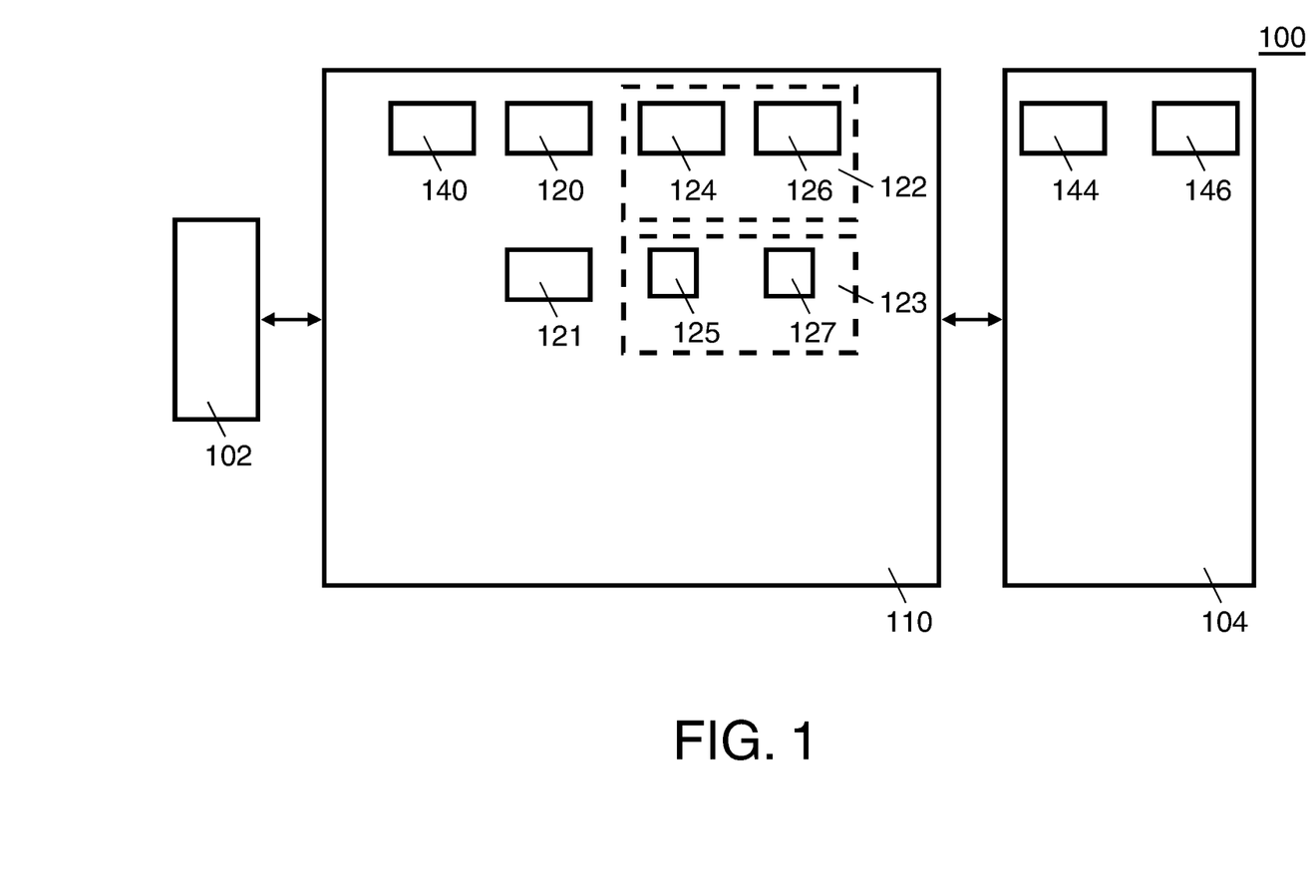
FIG. 1 is a block diagram illustrating a data processing device according to the invention.

FIG. 1 shows, in the form of a block diagram a data processing device 100 according to the invention. Only those components necessary for the elucidation of the invention are shown.

Data processing device 100 comprises a processor 102 and a memory 104. The processor 102 sends and receives data from the various components inside or outside of data processing device 100, in particular the memory 104. Read and write requests do not arrive directly at the memory 104, rather, in between the processor 102 and the memory 104 is a cache 110. The cache 110 is connected to the processor 102 and the memory 104.

The processor 102 can be a Central Processing Unit (CPU). The processor 102 may also be a data processing unit, such as a programmable data processing unit or a function specific data processing unit. The processor 102 may also be a Digital signal processor (DSP).

Note that a processor is not necessary to employ the method according the invention. Other architectures, e.g., in which the cache 110 is connected to a dedicated function hardware unit, are also possible.

Read requests and write requests from the processor 102 first arrive at the cache 110. If the cache 110 can handle the request on its own, it will do so. For example, a write request may be cached without immediately forwarding it to the memory 104; a read request may be completed by producing a data item from a cached copy of the data item. If the cache 110 cannot handle the request, it may pass the request further on to the memory 104.

The connection between the processor 102 and the cache 110 is typically an interface comprising a clock line and multiple parallel data lines, typically carrying address, data and control signals, all synchronized with a clock used by the processor 102. The connection between the cache 110 and the memory 104 is typically a bus.

The memory 104 comprises multiple memory elements, of which only a memory element 144 and a memory element 146 are shown. The memory element 144 and the memory element 146 are arranged for storing data items, such as bytes or words, etc.

The cache 110 comprises a cache line 122, which is associated with a memory address element 120. The cache line 122 comprises a data element 124 and a data element 126. The data element 124 and the data element 126 are arranged for storing data items such as those stored in the memory element 144 and the memory element 146. The cache 110 also comprises a dirty mask 123, and an associated counter 121. The dirty mask 123 comprises a dirty bit 125 and a dirty bit 127. The dirty bit 125 is for marking if the data element 124 has been updated. The dirty bit 127 is for marking if the data element 126 has been updated. The cache 110 also comprises a flag 140. The number of data elements in the cache line 122, here taken to be two, can be taken as any other convenient size. Advantageous sizes of the cache line 122 include: 8, 16, 32, 64, 128, 256 and 512 bytes.

During operational use, if the flag 140 is not set, the cache 110 behaves as an ordinary cache and does not employ the method according to the invention. Now, assume that the flag 140 has been set and that the cache 110 uses the method according to the invention. The cache line 122 is an example of a data element set as in the invention.

Although the data processing device 100 may have multiple memories and/or multiple caches, only one of each is shown in FIG. 1. For example, in between the cache 110 and the memory 104 a further cache may be arranged. A cache which is closer to the processor 102 is called 'lower', a cache which is closer to the main memory 104, is called 'higher'. The further cache is a higher level cache, i.e., positioned between the cache 110 and the memory 104. The further cache may use a regular replacement policy or a cache management policy according to the invention. Advantageously, if using multiple caches, the cache closest to the processor, i.e., the level one cache, uses a method according to the invention. The reason being, that in the level one cache the read and write requests typically arrive individually, but they are combined in larger units for the higher level caches. In a refinement, the level one cache, marks data which is passed to a higher level cache as 'write through' so that it is sent straight to main memory 104, without being cached. Alternatively, the higher level cache stores the data in one of its cache lines and also marks the data as a write-back candidate or preferred replacement victim, such that early copy-back is triggered and the data will only be stored in the higher level cache for a short period of time.

If the cache line 122 is free, i.e., is not currently used for the caching of data items, and a read request for one of the memory element 144 and the memory element 146, say the memory element 146, is received, then the cache 110 will retrieve from the memory 104 both the data items stored in the memory element 144 and the memory element 146. A representation of the memory address of the memory element 144 is stored in the memory address element 120. Both the dirty bit 125 and the dirty bit 127 are marked as not-dirty, i.e., clean, and the counter 121 is set to 0. When a write request is received in the cache 110, say for the memory element 144, then the data element 124 is updated with a new data item from the write request, the dirty bit 125 is marked dirty, and the counter 121 is incremented with one. When a write request is received in the cache 110, for the memory element 146, then the data element 126 is updated with a new data item from the write request, the dirty bit 127 is marked dirty and the counter 121 is incremented with one.

There is a detection mechanism (not shown) in the cache 110 which detects that the counter 121 has reached a counting value equal to the number of elements in the cache line 122, i.e., in this case two. At this point the cache line 122 is marked as a write-back candidate, by forwarding the cache line 122 to a write back mechanism (not shown). The write back mechanism writes the content of the data element 124 to the memory element 144 and the content of the data element 126 to the memory element 146, based on the memory address element 120. The write back mechanism also resets the counter 121 back to 0, and marks the dirty bit 125 and the dirty bit 127 as not-dirty. Note that the cache line 122 may be marked as a write-back candidate in various ways. For example: a dedicated bit (not shown) may be set to indicate that the cache line 122 is a write back candidate; a representation of the location of the cache line 122 may be put on a list of write-back candidates; or the counter 121 may be left at the counting value to indicate that the corresponding cache line 122 is a write-back candidate.

If a new read request arrives in the cache 110 for an element of the memory 104, after the cache line 122 was written back to the memory 104, then the cache 110 can immediately use the cache line 122 for caching this new read request.

An alternative implementation is to check the dirty mask 123 and/or the counter 121 only when a free cache line is required, but none are available, e.g., because new data items need to be stored in the cache 110, yet the cache 110 is full. If it is detected that all elements of the cache line 122 are dirty, then the cache line 122 is written to memory and the cache line 122 is used for the new data items. If no cache line is found of which all elements are dirty, a clean cache line can be selected using a regular LRU policy.

In the example given above, the cache line 122 was first filled with a read request before elements were updated via write requests. This is not necessary though, the initial filling of the cache line 122 might also have been initiated with a write request.

Figure 2:
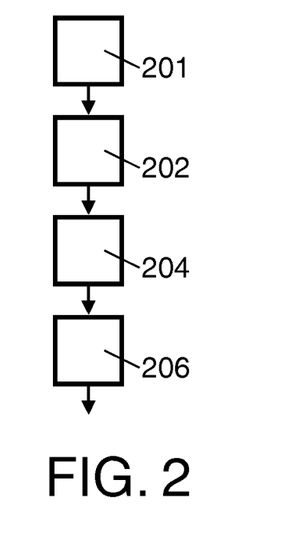
FIG. 2 shows a flow chart illustrating a method according to the invention.

In FIG. 2 a flow chart is given of a method according to the invention. The method given in FIG. 2 comprises four steps, step 201, step 202, step 204 and step 206. In step 201 each one of the multiple data elements are individually marked as updated through at least one write request. In step 202 it is determined that each one of the multiple data elements (124, 126) has been updated through at least one write request. In response to this determination, the data element set 122 is marked as a write-back candidate, this is step 204. Finally, in step 206 the write-back candidate is written to memory 104.

The method according to the invention improves the data cache efficiency. In particular, the method is beneficial for the specific memory access patterns of video output data. A cache replacement strategy that victimizes a cache line once the cache line is completely written, in order to trigger an early copy back operation, takes advantage of a memory access patterns wherein all data elements stored in a cache line are produced in a short time interval and not updated thereafter for a long period, relative to the average time that the data of the cache line remains stored in the cache.

Accordingly, the output data consumes minimal space in the cache, making this space available for other uses, such as video input data, or the method allows a smaller, and hence cheaper, cache.

The order of the steps of a method according to the invention may be varied, and other steps may be interposed. The method may be embodied in computer program code. In order to meet the high performance requirements for caches, when an embodiment uses computer program code this will typically be implemented using so-called microcode. The program code is typically executed in the cache itself by specialized circuitry that interprets the microcode. The program code can be stored in any suitable computer readable medium, such as a memory, a magnetic storage, etc. The program code may also be transmitted, e.g., over the Internet. The method may also be executed using dedicated hardware. For example, the method may be embodied in hardware, which is tightly coupled and/or integrated with the cache 110.

Typically, the method will be embodied in hardware.

If a cache with a standard LRU replacement policy is used for input and output data, both the input and the output data occupy a substantial amount of cache space. In many video processing applications, there is no need to keep output data in the cache, since it is only written once. For input data, on the contrary, the cache is very useful. Hence, the standard replacement policy leads to inefficient cache utilization for this particular class of applications.

In a video processing application, data is typically read from one or multiple input images and results are written into one or multiple output images. Data that is written is typically not used anymore until the whole image has been processed.

Especially functions applying motion estimation and motion compensation (as in advanced scan rate conversion) benefit from caches that can contain video data related to a two-dimensional search area, as they access data identified by a motion vector within this search area. This input data may show relatively irregular access patterns, where the cache serves as a storage buffer for the search area. When analyzing output data, however, this is typically written in a relatively regular pattern. For example, output data is produced block by block in a regular scanning order. Furthermore, this data is written once, and not accessed anymore for the time it remains in the data cache. These two observations imply that only a small amount of cache space is required for output data. Using a cache for output data is primarily a means to buffer the output. This buffering function of the cache is especially useful if the output data is an image and is produced in an order corresponding to a block pattern. To convert the blocks to an image line, in which order it will be stored in memory, the data comprised in the blocks need temporary buffering.

In view of these characteristics of output data, it is understood that the LRU replacement policy has substantial disadvantages. Even though a cache line with output data is complete and ready for copy-back, it will not be victimized by an LRU policy until it has become the least-recently-used cache line of its set. Only when it is sufficiently "aged" does it becomes a replacement victim, triggering copy-back and invalidation of the cache line, i.e., marking as free. In the mean time, read data residing in the cache may be victimized, even though this read data will be referenced in the future. In conclusion, as a result of the LRU policy, a substantial amount of output data remains in the cache for too long, hampering the performance of the cache.

Figure 3:
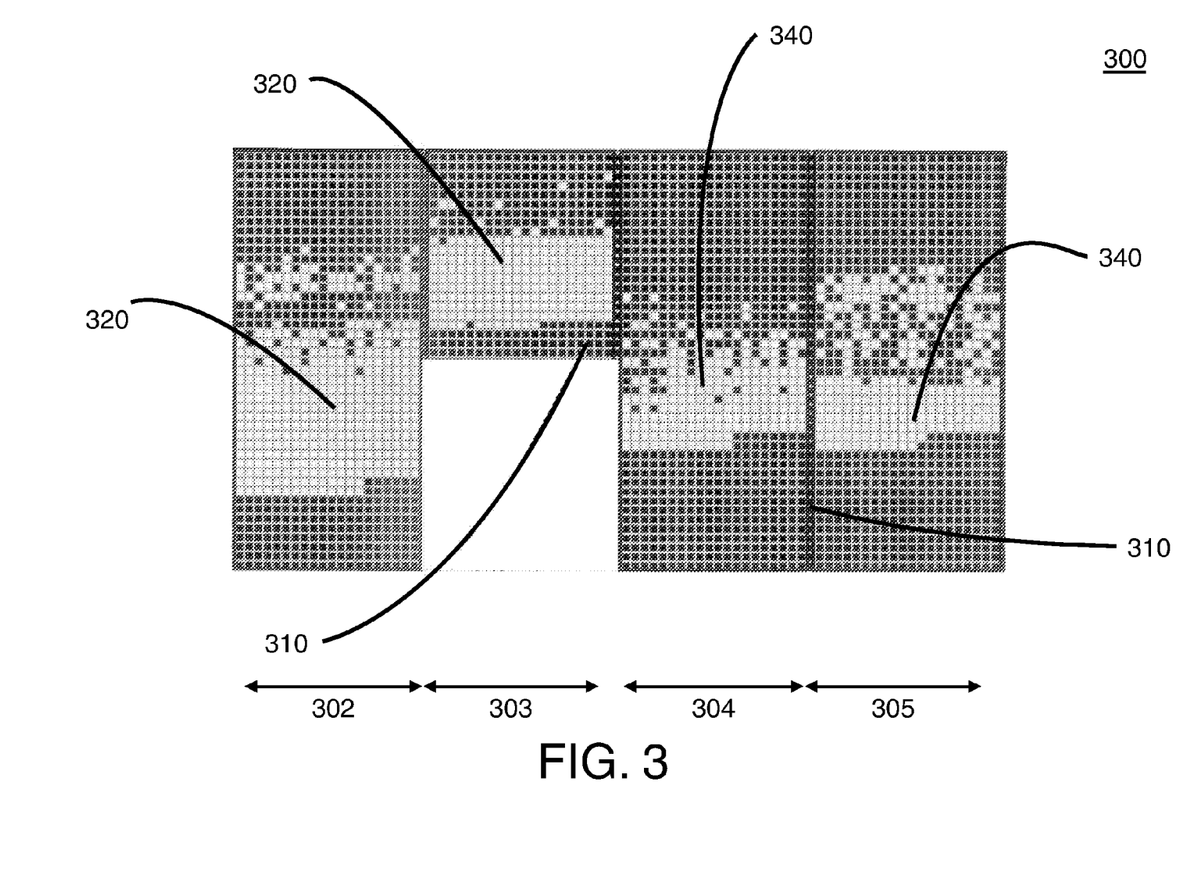
FIG. 3 shows a memory map illustrating cache usage for a video processing application, wherein the cache uses an LRU replacement policy.

FIG. 3 shows a simulation result in the form of a memory map 300. The memory map 300 is a snapshot taken during a simulation of a video processing method. The simulation fetched data into the cache by pre-fetch operations or by regular cache misses. The data is written in small blocks of pixel data from top to bottom, left to right. The simulation shown in FIG. 3 uses a known cache replacement strategy. The shade of gray of each block indicates the cache status of the corresponding memory element. Light gray indicates a cached memory element.

The simulation used two input images, read from regions 302 and 303, and produces two output images, written to regions 304 and 305, respectively. Memory elements 310, indicated in black, are not currently cached. Memory elements 320, indicated in grey, are cached. Memory elements 340 are also cached. Note that the memory elements 320 are used for the input images, and that the memory elements 340 are used for output images.

FIG. 3 shows, that at this point in the simulation, a substantial amount of output data is still in the cache, occupying space that now cannot be used for input data. The latter can be seen from the area of the memory elements 340.

Figure 4:
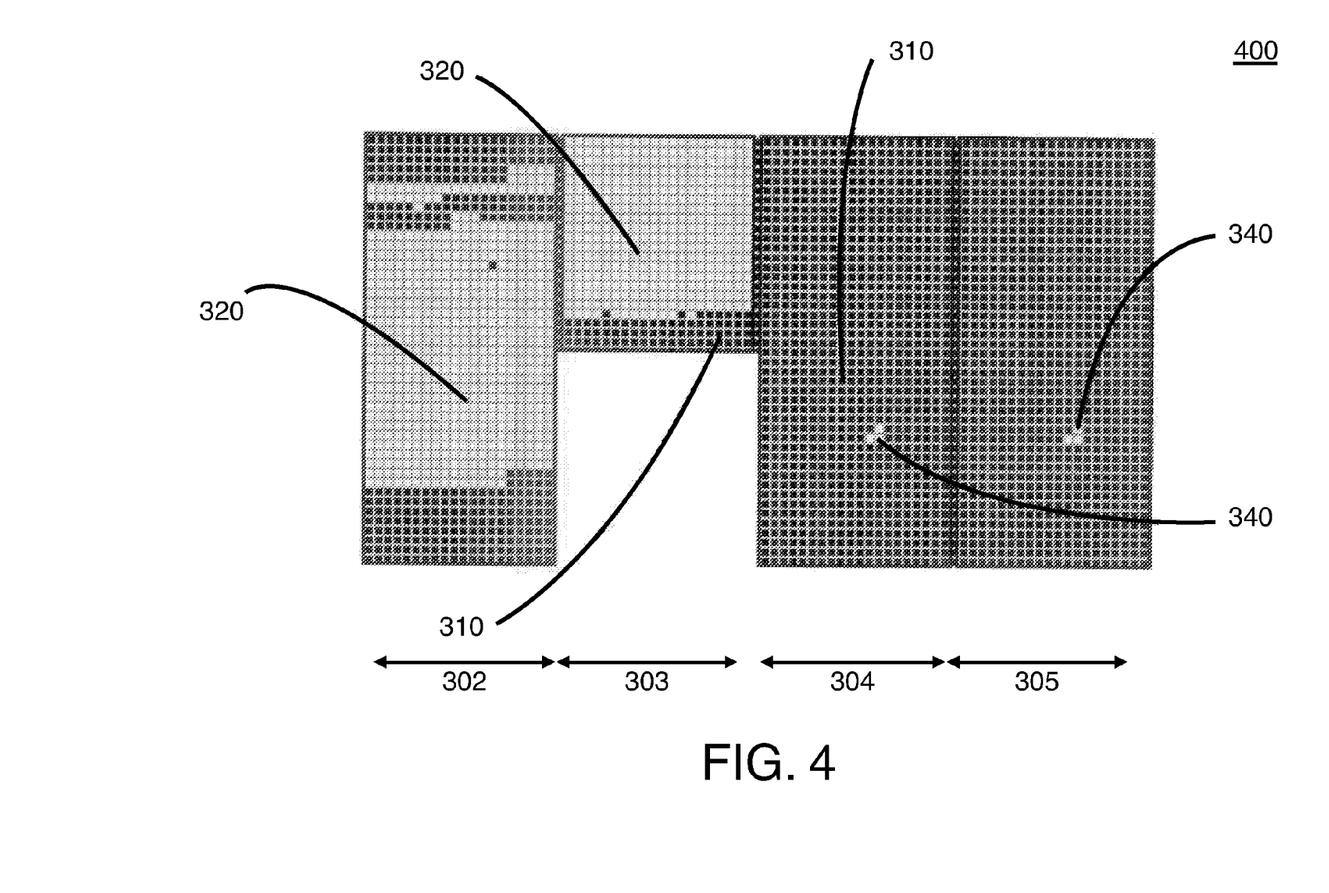
FIG. 4 shows a memory map illustrating cache usage for a video processing application, wherein the cache uses a cache management policy according to the invention.

FIG. 4 also shows a simulation result in the form of a memory map 400. The memory map 400 is a snapshot taken during the same simulation done for FIG. 3. However, the simulation shown in FIG. 4 uses a cache replacement strategy according to the invention: a copy back-and-invalidate action was forced on the output data shortly after a complete cache line was written. The snapshots of the memory maps in FIGS. 3 and 4 show the status at approximately the same output locations of the memory image. It can be seen, in FIG. 4, that the amount of cache space occupied by the output data, the memory elements 340, is very small. Furthermore, the amount of input data in the cache, the memory elements 320, is substantially larger compared to the snapshot in FIG. 3.

Having more cache available for input data is an advantage as it increase the processing speed. It is also possible to keep the same processing speed, but to construct a smaller cache. This reduces the manufacture price of the device employing the method according to the invention.

There may be cases where the cache line is not completely written, e.g., at the end of a video line. This will not result in erroneous behavior, since in such cases the regular replacement policy remains in effect and the copy-back is just delayed. Since this only occurs in relatively few cases, this invention provides a simple method to substantially improve effectiveness of the data cache for video applications.

The proposed method only influences the cache performance, not its basic functionality. Therefore, in cases that not all write data adheres to the characteristics mentioned above, the method may still be applied. For example, in a situation wherein a small fraction of the output pixels is written twice, the first write operation may trigger the early victimization and hence, the data will be copied to the memory. The second write will then cause a fetch and modification of the cache line, as part of the normal cache operation. Consequently, the system still behaves correctly. A performance penalty is now introduced for this particular case. If the probability of such double write operations is low enough, the method would still result in substantially improved cache efficiency.

What is claimed is:

1. A method for writing back to a memory a data element set stored in a cache, the data element set comprising multiple data elements, the method comprising:
marking individually each one of the multiple data elements as updated through at least one write request;
determining that each one of the multiple data elements has been updated through at least one write request;
marking the data element set as a write-back candidate, in dependency on said determination; and
writing the write-back candidate to the memory substantially immediately after marking the data element set as a write-back candidate.

2. A method as in claim 1 comprising after the writing of the write-back candidate, marking the data element set as free.

3. A method as in claim 1 comprising after the writing of the write-back candidate, using the data element set to cache a read request or a further write request.

4. A method as in claim 1, wherein a dirty mask comprises for each specific one of the multiple data elements a specific dirty bit for marking if the specific data element is updated through the write request, wherein the marking individually each one of the multiple data elements as updated through at least one write request, comprises
marking the specific dirty bit as dirty, upon receiving the write request updating the specific data element,
wherein the determining that each one of the multiple data elements have been updated comprises determining that all dirty bits in the dirty mask are marked dirty.

5. A method as in claim 4, wherein the dirty mask is coupled to a counter, wherein the method comprises:
updating the counter, upon marking the specific dirty bit as dirty, wherein the determining that all dirty bits in the dirty mask are marked dirty comprises a determining that the counter has reached a counting value representative of the number of data elements in the data element set.

6. A method as in claim 5, wherein the memory comprises an address range and the marking of the data element set as a write-back candidate is done conditionally on the write request being for an address in the address range.

7. A method as in claim 6, wherein the cache is arranged with a supplementary cache for caching of a supplementary write request, the supplementary write request being for an address outside the address range.

8. A method as in claim 4, wherein the marking of the data element set as a write-back candidate is done conditionally on a flag being set, the flag being arranged for being set and being reset.

9. A method as in claim 8, wherein the writing of the write-back candidate is done upon determining that a free data element set is required.

10. A method as in claim 1 wherein
a time stamp is associated with the data set;
the marking the data element set as a write-back candidate comprises setting the time stamp to a predetermined value; and
the method comprises before the writing of the write-back candidate, selecting the write-back candidate from multiple data sets, by determining that the value of the time stamp is more or less than values of multiple time stamps associated with the multiple data sets.

11. A non-transitory computer readable medium storing computer-executable instructions which when executed in a controller are operable for writing back to a memory a data element set stored in a cache, the data element set comprising multiple data elements, the medium comprising instructions for:
marking individually each one of the multiple data elements as updated through at least one write request;
determining that each one of the multiple data elements has been updated through at least one write request;
marking the data element set as a write-back candidate, in dependency on said determination; and
writing the write-back candidate to the memory substantially immediately after marking the data element set as a write-back candidate.

12. A data processing system for writing back to a memory a data element set stored in a cache, the data element set comprising multiple data elements, the data processing system having computer executable instructions that enable the data process system to:
mark individually each one of the multiple data elements as updated through at least one write request;
determine that each one of the multiple data elements has been updated through at least one write request;
mark the data element set as a write-back candidate, in dependency on said determination; and
write the write-back candidate to the memory substantially immediately after marking the data element set as a write-back candidate.

13. A method for writing back to a memory a data element set stored in a cache, the data element set comprising multiple data elements, the method comprising:
marking individually each one of the multiple data elements as updated through at least one write request;
determining that each one of the multiple data elements has been updated through at least one write request;
marking the data element set as a write-back candidate, in dependency on said determination; and
writing the write-back candidate to the memory,
wherein the writing of the write-back candidate to the memory comprises sending the write-back candidate to a further cache together with a write-through flag, and
wherein the write-through flag indicates to the further cache to write the write-back candidate substantially directly to memory.

14. A method as in claim 13 comprising after the writing of the write-back candidate, marking the data element set as free.

15. A method as in claim 13 comprising after the writing of the write-back candidate, using the data element set to cache a read request or a further write request.

16. A method as in claim 13, wherein a dirty mask comprises for each specific one of the multiple data elements a specific dirty bit for marking if the specific data element is updated through the write request, wherein the marking individually each one of the multiple data elements as updated through at least one write request, comprises
marking the specific dirty bit as dirty, upon receiving the write request updating the specific data element,
wherein the determining that each one of the multiple data elements have been updated comprises determining that all dirty bits in the dirty mask are marked dirty.

17. A method as in claim 16, wherein the dirty mask is coupled to a counter, wherein the method comprises:
updating the counter, upon marking the specific dirty bit as dirty, wherein the determining that all dirty bits in the dirty mask are marked dirty comprises a determining that the counter has reached a counting value representative of the number of data elements in the data element set.

18. A method as in claim 17, wherein the memory comprises an address range and the marking of the data element set as a write-back candidate is done conditionally on the write request being for an address in the address range.

19. A method as in claim 18, wherein the cache is arranged with a supplementary cache for caching of a supplementary write request, the supplementary write request being for an address outside the address range.

20. A method as in claim 16, wherein the marking of the data element set as a write-back candidate is done conditionally on a flag being set, the flag being arranged for being set and being reset.

21. A method as in claim 20, wherein the writing of the write-back candidate is done upon determining that a free data element set is required.

22. A method as in claim 13 wherein
a time stamp is associated with the data set;
the marking the data element set as a write-back candidate comprises setting the time stamp to a predetermined value; and
the method comprises before the writing of the write-back candidate, selecting the write-back candidate from multiple data sets, by determining that the value of the time stamp is more or less than values of multiple time stamps associated with the multiple data sets.

23. A non-transitory computer readable medium storing computer-executable instructions which when executed in a controller are operable for writing back to a memory a data element set stored in a cache, the data element set comprising multiple data elements, the medium comprising instructions for:
marking individually each one of the multiple data elements as updated through at least one write request;
determining that each one of the multiple data elements has been updated through at least one write request;
marking the data element set as a write-back candidate, m dependency on said determination; and
writing the write-back candidate to the memory,
wherein the writing of the write-back candidate to the memory comprises sending the write-back candidate to a further cache together with a write-through flag, and
wherein the write-through flag indicates to the further cache to write the write-back candidate substantially directly to memory.

24. A data processing system for writing back to a memory a data element set stored in a cache, the data element set comprising multiple data elements, the data processing system having computer executable instructions that enable the data process system to:
mark individually each one of the multiple data elements as updated through at least one write request;
determine that each one of the multiple data elements has been updated through at least one write request;
mark the data element set as a write-back candidate, in dependency on said determination; and
write the write-back candidate to the memory,
wherein the writing of the write-back candidate to the memory comprises sending the write-back candidate to a further cache together with a write-through flag, and
wherein the write-through flag indicates to the further cache to write the write-back candidate substantially directly to memory.

* * * * *